US007813713B2

(12) United States Patent
Davis

(10) Patent No.: US 7,813,713 B2
(45) Date of Patent: Oct. 12, 2010

(54) FIRST RESPONDER COMMUNICATION SYSTEM

(76) Inventor: Russell J. Davis, 9747 Water Oak Dr., Fairfax, VA (US) 22031-1029

(*) Notice: Subject to any disclaimer, the term of this patent is extended or adjusted under 35 U.S.C. 154(b) by 1009 days.

(21) Appl. No.: 11/320,617

(22) Filed: Dec. 30, 2005

(65) Prior Publication Data
US 2007/0155362 A1  Jul. 5, 2007

(51) Int. Cl.
*H04M 11/04* (2006.01)
(52) U.S. Cl. .............. 455/404.1; 455/404.2; 455/550.1; 455/90.1; 379/188
(58) Field of Classification Search .............. 455/404.1, 455/90.1, 404.2, 550.1; 379/188
See application file for complete search history.

(56) References Cited

U.S. PATENT DOCUMENTS

| 5,563,931 | A | * | 10/1996 | Bishop et al. ............ 455/404.1 |
| 5,574,977 | A | | 11/1996 | Joseph et al. |
| 5,615,249 | A | | 3/1997 | Solondz |
| 5,729,591 | A | | 3/1998 | Bailey |
| 6,112,101 | A | | 8/2000 | Bhatia et al. |

(Continued)

FOREIGN PATENT DOCUMENTS

DE   4302820   10/1994
JP   2004015717   1/2004

OTHER PUBLICATIONS www.safetyandsecuritycenter.com/mo911emceph.html "Emergency Medical Alarm Cell Phone" Retrieved on Oct. 26, 2005.
www.emsmagazine.com/ffr/ffrjun0002.html "Speak Easy: Techologies to Improve Two-Way Communications for First Responders" Retrieved on Oct. 26, 2005.

(Continued)

*Primary Examiner*—Nghi H Ly
*Assistant Examiner*—Amancio Gonzalez
(74) *Attorney, Agent, or Firm*—Richard C. Litman

(57) ABSTRACT

The first responder communication system provides a digitally signed data object identifying first responders. Utilizing the digitally signed data object, a mobile cellular switching system (MCS), has a call completion protocol to verify first responder call status and permit the connection to queue. Upon emergency declaration, non-first responders are denied access to the system. The digitally signed object may be provided by a PIV card interfaced to the wireless cellular telephone. The digitally signed object is released from the PIV after a user enters a PIN using a key pad of the cellular telephone. After the valid digitally signed object has been transmitted, continued priority cell phone operations is provided for the validity time period even though the PIV has been removed from the cell phone interface.

14 Claims, 6 Drawing Sheets

U.S. PATENT DOCUMENTS

| | | | |
|---|---|---|---|
| 6,223,052 B1 | 4/2001 | Vehmas et al. | |
| 6,356,769 B1 | 3/2002 | Vehmas et al. | |
| 6,360,103 B2 | 3/2002 | Veerasamy | |
| 6,597,920 B2 | 7/2003 | Yegani et al. | |
| 6,628,949 B1 | 9/2003 | Park | |
| 6,745,043 B1 | 6/2004 | Lester et al. | |
| 6,799,155 B1* | 9/2004 | Lindemann et al. | 703/24 |
| 2005/0003797 A1* | 1/2005 | Baldwin | 455/404.1 |
| 2005/0119016 A1 | 6/2005 | Neuman | |
| 2005/0176466 A1 | 8/2005 | Verloop et al. | |
| 2005/0215229 A1* | 9/2005 | Cheng | 455/404.1 |
| 2006/0046744 A1* | 3/2006 | Dublish et al. | 455/456.3 |
| 2006/0273893 A1* | 12/2006 | Warner | 340/531 |

OTHER PUBLICATIONS www.msvlp.com/pr/news_releases_view.cfm?id=70 "Turning First Responder Cell Phones Into First Priority Satellite Phones" Retrieved on Oct. 26, 2005.

www.teamware.com/office/fs-securemail.htm "Keeping your e-mail communication confidential" Retrieved on Dec. 21, 2005.

* cited by examiner

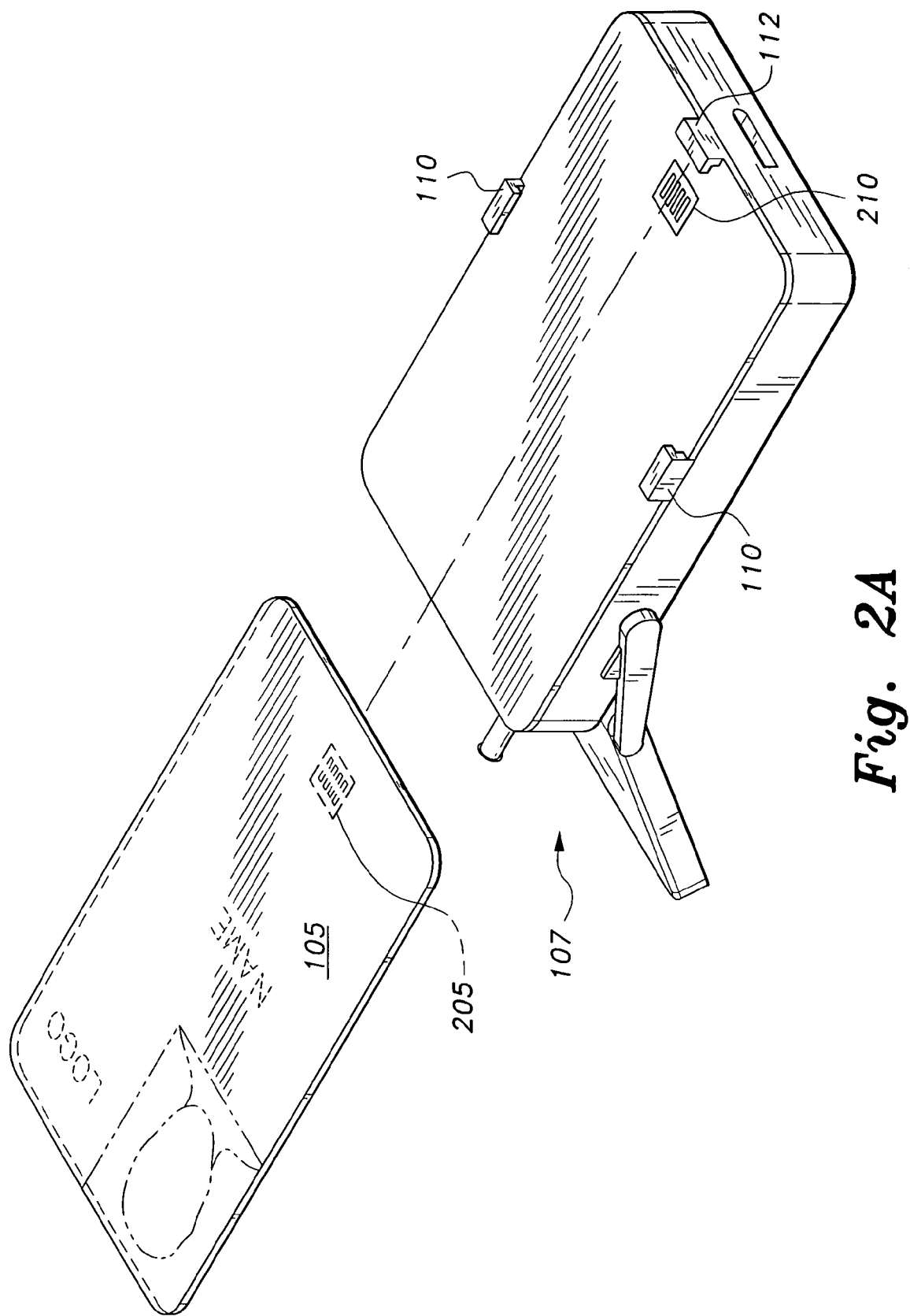

FIRST RESPONDER COMMUNICATION SYSTEM

BACKGROUND OF THE INVENTION

1. Field of the Invention

The present invention relates to telecommunications protocols, and more specifically to a protocol used to ensure that first responders gain access to wireless cellular communications during emergencies.

2. Description of the Related Art

A spike in call volume often occurs within the wireless cellular communication system following a disaster. The call volume spike is a resultant of a variety of non-emergency "I'm ok are you ok?" type calls, to truly emergency calls placed by first responders dealing with public safety operations in response to the disaster. When the call volume spike exceeds the capacity of system servers required for call completion, the reliability of the system is degraded.

Such system degradation can result in failures ranging from spotty outages to a complete system crash in which no calls can be completed. However, it is essential that first responders have effective and reliable access to the wireless cellular telecommunications system in addition to other systems that may be in use for emergency communication.

German patent DE 4302820, dated October, 1994 discloses a mobile radio telephone unit including telephone cards, credit cards and the like having mechanical and electronic interfaces. The cards are used to select between two radio networks based on a pre-defined priority. There apparently is, however, no discussion or suggestion of exclusively giving first responders access to either of the two networks.

Additionally, Japanese patent JP 2004015717, dated January, 2004, discloses a priority control function that prioritizes the myriad of features contained in a mobile telephone, however does not disclose nor suggest a means for exclusively giving first responders access to the mobile telephone switching center.

None of the above inventions and patents, taken either singly or in combination, is seen to describe the instant invention as claimed. Thus, a first responder communication system solving the aforementioned problems is desired.

SUMMARY OF THE INVENTION

The first responder communication system provides a means for modifying the current cell phone system to use Personal Identity Verification cards, i.e., PIV cards which are to be issued to all first responders as part of a Department of Homeland Security (DHS) effort. The PIV cards are compliant with the National Institute of Standards and Technology (NIST) Federal Information Processing Standards (FIPS) Publication 201 for Personal Identity Verification (PIV).

These PIV cards provide strong identification and authentication, and when used in combination with a cellular telephone system according to the present invention provide a means of ensuring effective and reliable cell telephone communications during emergency operations.

The present invention provides a digitally signed data object identifying first responders. A means for transmitting the digitally signed data object is provided for use by commercial cell phone systems. For example, utilizing the digitally signed data object, the back end cell phone systems, i.e., mobile cellular switching system (MCS), has a call completion protocol to verify that the call is a legitimate first responder and permit the connection to queue. Once an emergency is declared, the present invention provides for denial of access to non-first responder callers. Alternatively, non-emergency calls could be limited to a smaller volume depending on the magnitude of the emergency event.

According to the present invention, a digitally signed object is included with a validity period that indicates how long the first responder has priority access to the wireless cellular telecommunications system.

To digitally sign the object, the present invention provides temporary, i.e., removably operable communication with the PIV card through an interface that also provides physical compatibility with existing cellular telephone handset geometries. The interface may be comprised of a Personal Computer Smart Card (PC/SC) interface, as specified by the PC/SC workgroup, a consortium of industry leaders including, inter alia, Philips, Microsoft, Axalto, Gemplus and Toshiba corporations. Preferably, the digital signed object is released from the PIV by having a user first enter a personal identification number (PIN) using a key pad of the cellular telephone. The cell phone of the present invention includes processes to insure that the digitally signed object has not been compromised.

The digitally signed object is cached in the cell phone for the validity time period. Thus, after a valid digitally signed object has been released, i.e., transmitted, the present invention provides for continued priority cell phone operations for a duration of the validity time period even though the PIV has been removed from the cell phone interface.

These and other features of the present invention will become readily apparent upon further review of the following specification and drawings.

BRIEF DESCRIPTION OF THE DRAWINGS

FIG. 2A is a partially exploded view of the PIV card and cell phone, according to the present invention.

Similar reference characters denote corresponding features consistently throughout the attached drawings.

DETAILED DESCRIPTION OF THE PREFERRED EMBODIMENT

Figure 1:
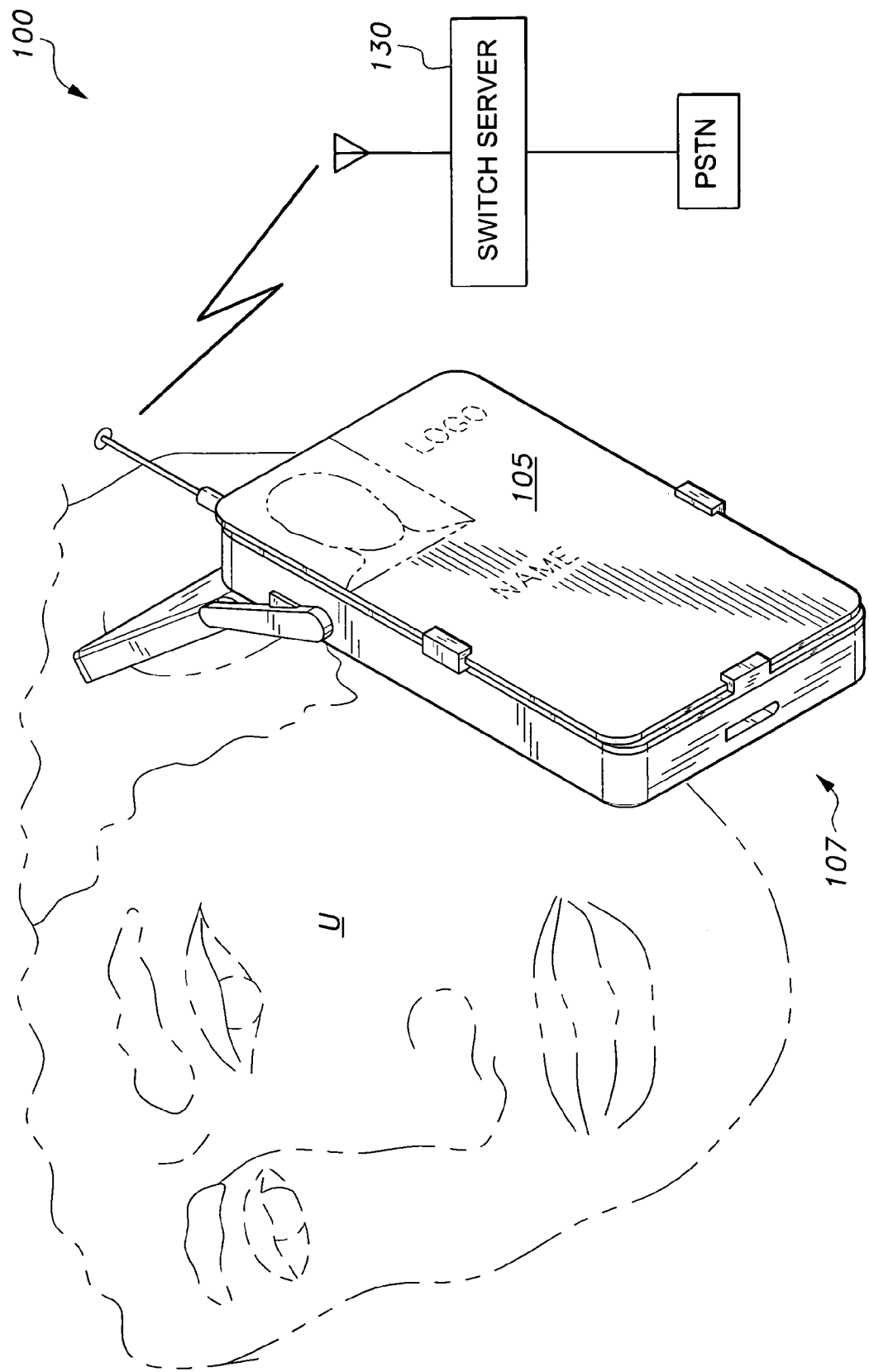
FIG. 1 is an environmental, perspective view of a first responder communication system according to the present invention.
Figure 2B:
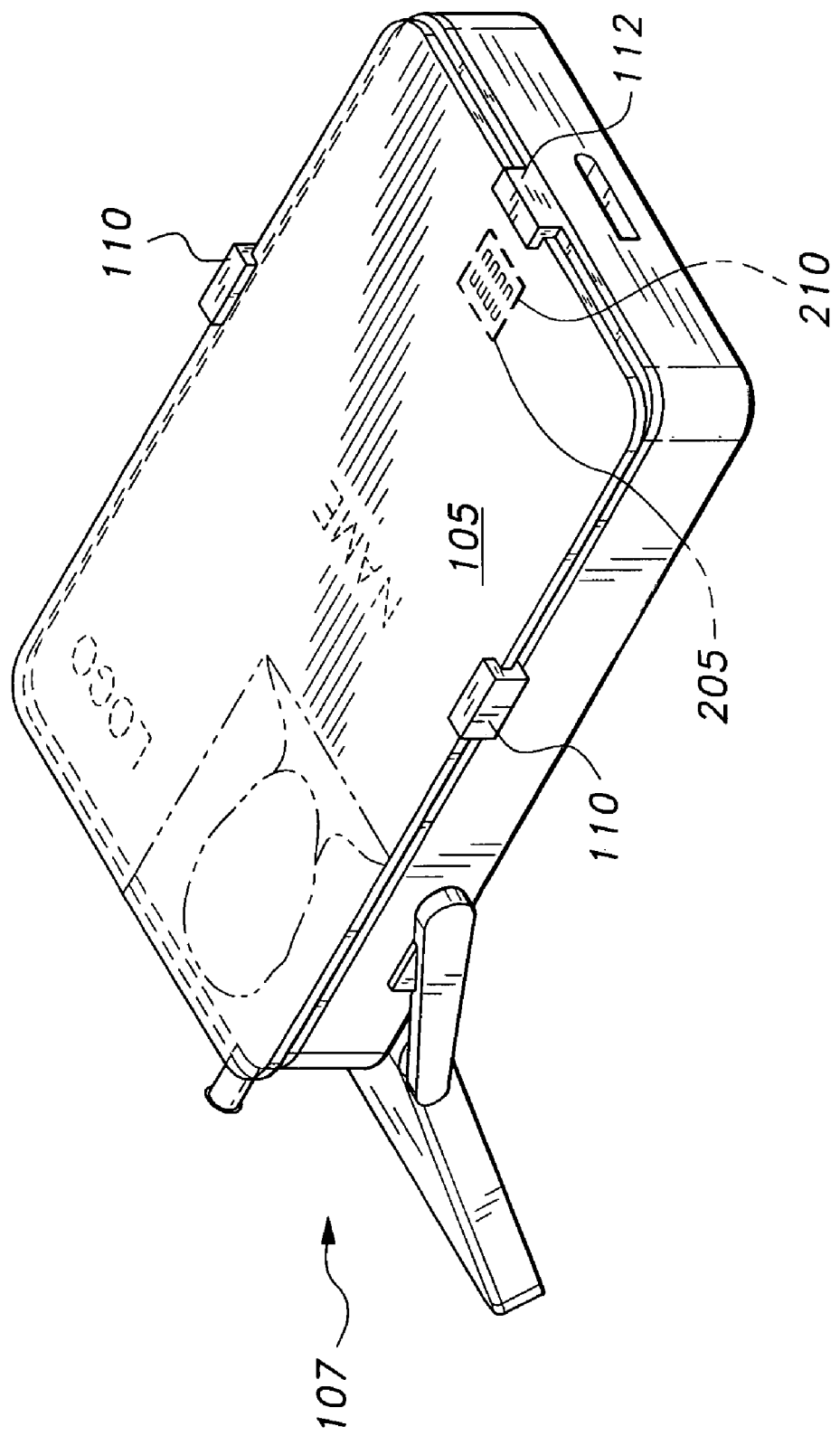
FIG. 2B is a perspective view of the PIV card attached to the cell phone, according to the present invention.

As shown in FIG. 1, the present invention provides a cell phone 107 in combination with a smart card 105, the combination being operable to communicate with a mobile cellular switching system 130. This combination allows for a digitally signed data object identifying a first responder, such as user U, to be created for cell phone call prioritization. Smart card 105 may be a generic integrated circuit card (ICC) or it may be the Personal Identity Verification (PIV) card as specified by NIST FIPS publication 201. Additionally, smart card 105 may be a SIM card, and may be internally mounted instead of externally mounted. Irrespective of card geometry, the card 105 should have a minimum card content comprising digitally signed photograph of the user, left and right index finger of the user, public key infrastructure (PKI) certificates, user identity, and card issuer identity. Preferably, a digitally signed emergency responder designation should also be made available by the card 105 so that the emergency responder designation can be included in the digitally signed data object. Moreover, the card should have logical elements required for cryptographic and digital signing of data objects, encrypting and decrypting data objects, PIN processing, and biometric data processing.

In other words, in usage instances when the card 105 is not physically constructed like a PIV as specified by NIST FIPS publication 201, the card should possess most of the card content and logic element features of the PIV for effective use according to the present invention.

A means for transmitting the digitally signed data object is provided for use by commercial cell phone systems. For example, as shown in FIGS. 1 through 4, utilizing the digitally signed data object, the back end cell phone systems, i.e., mobile cellular switching server 130 (MCS), has a call completion protocol 400 to verify that the call is a legitimate first responder and permit the connection to queue. Once an emergency is declared, the present invention provides for denial of access to non-first responder callers. While denying access to the non-first responder callers, the switching system 130 has the capability to activate a busy signal generator that sends a busy signal to the non-first responder cell phones. Alternatively, non-emergency calls could be limited to a smaller volume depending on the magnitude of the emergency event.

According to the present invention, the digitally signed object is included with a validity period that indicates how long the first responder has priority access to the wireless cellular telecommunications system.

To digitally sign the object, the present invention provides temporary, i.e., removably operable communication with the PIV card 105 through an authentication interface that also provides physical compatibility with existing cellular telephone handset geometries. For example, retractable card retaining clips 110 may be slidably attached along the sides of cell phone 107 to allow the retention of smart card 105 adjacent to the back of the cell phone 107. Additionally a stationary retaining clip 112 may be provided to prevent the smart card 105 from sliding off of the cell phone 107. A smart card compatible wired contact grid 210 may be provided for electrical connection to the card 105. The interface may be comprised of a Personal Computer Smart Card (PC/SC) interface, as specified by the PC/SC workgroup, a consortium of industry leaders including, inter alia, Philips, Microsoft, and Toshiba corporations. It is also within the scope of the present invention to provide a contactless card interface employing wireless proximity technologies such as RFID and the like.

Preferably, the digital signed object is released from the PIV by having a user first enter an authentication code such as personal identification number (PIN) using a key pad (not shown) of the cellular telephone 107. Optionally, the user may press SEND, CALL, or any other suitable key on the key pad that can be programmed to signal that the PIN entry is complete. The cell phone 107 of the present invention includes processes to insure that the digitally signed object has not been compromised. For example, the cell phone 107 may include a validity checker having means for comparing signature validity criteria such as biometric data provided by the card 105 to a biometric scan of the user U as a valid signature test such, as shown in FIG. 3, at step 325, before completing the call initiation process.

Upon correct entry of the PIN, the digitally signed object is cached in the cell phone, i.e., stored in the cell phone's memory for a validity time period. Preferably the cell phone memory storage comprises a data structure having a cellular telephone identifying number, and is accessible to the integrated circuit card (ICC) or personal identity verification card (PIV) for content encryption and subsequent digital signing so that it can store an encrypted and digitally signed identifying number. Hence, after a valid digitally signed object has been released, i.e., transmitted to the switching system, the present invention provides for continued priority cell phone operations for a duration of the validity time period even though the PIV has been removed from the cell phone interface. Thus, the cell phone 107 would need to use the PIV 105 only once, to initialize a priority operations time period. Preferably, immediately after the priority operations time period initialization, the system prompts the first responder to remove his/her PIV card and close the smart card connection.

Figure 3:
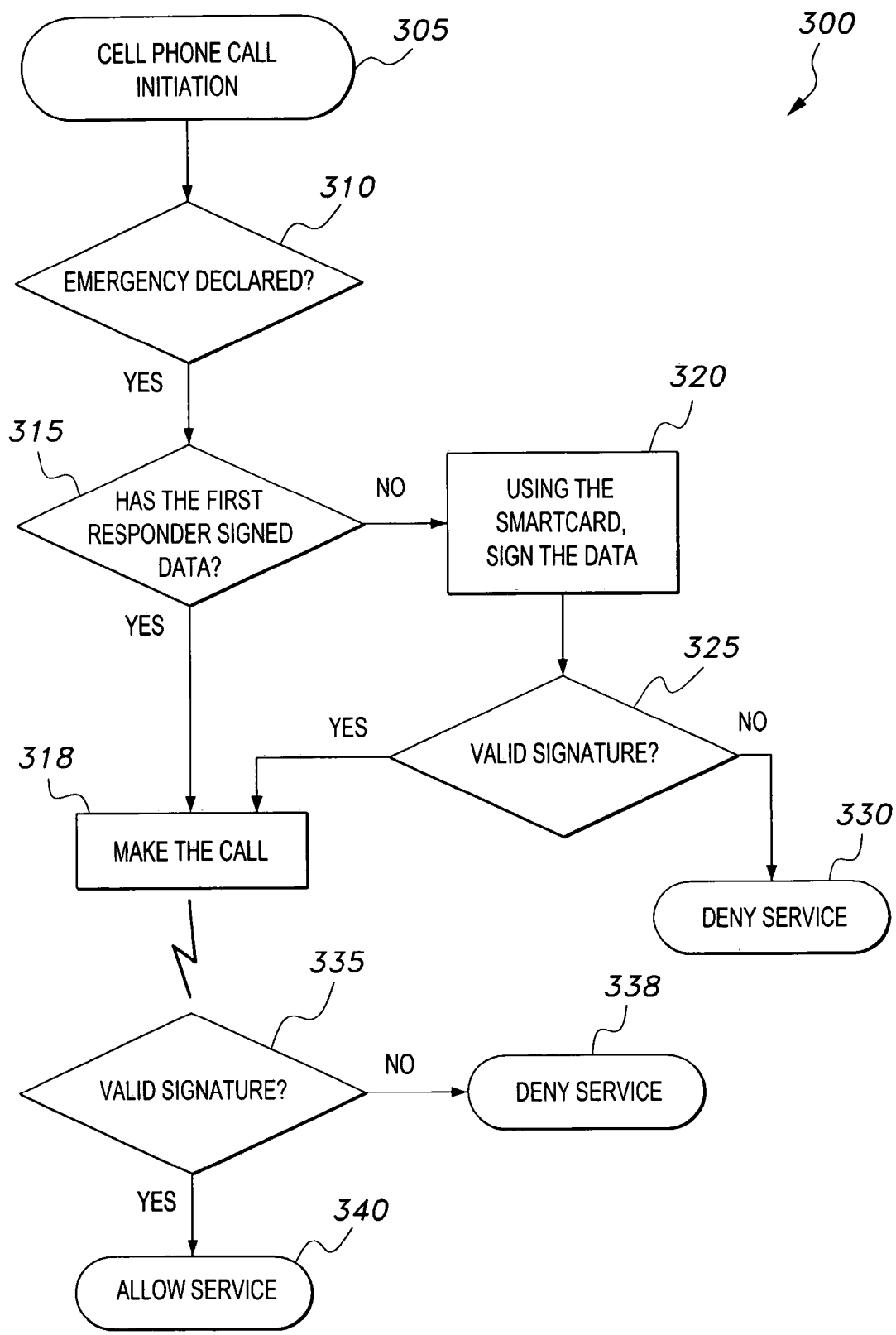
FIG. 3 is a flow diagram of PIV authentication processes, according to the present invention.

Referring to FIGS. 1 and 3, the process flow 300 of the present invention includes cell phone call initiation at step 305 followed by a determination of whether an emergency has been declared at step 310. The determination at step 310 may be made by the cell phone 107 in response to a wireless communication transmitted by the switch 130.

The wireless communication transmitted by the switch 130 may inform all handsets of the emergency event and that calls should not be attempted unless properly authenticated via a digital signature from a first responder PIV card 105. As shown at step 315, the cell phone 107 may then wait in a processing loop such as at step 320 until the first responder has signed the data object for transmission to the switch 130.

After the validity signature check at step 325, further call processing within the cell phone 107 is halted by denial of service, as shown at step 330, if the signature check of step 325 fails to confirm a valid signature.

Provided that a valid signature is determined by the cell phone, as shown in step 318, the call is made by the cell phone. Call parameters including the digitally signed object are sent to the switch via a wireless transmission.

At the switch 130 a second signature validity check is performed, as shown at step 335. Since the user U is not physically present at the switch 130, the validity check is restricted to validity criteria such as data integrity and data authenticity. Public encryption keys of first responders are, preferably, known by the mobile cellular switching system 130. Because the PIV supports Public Key Infrastructure (PKI), the digitally signed data object validity check may include use of the user's public encryption key to determine whether in fact the transmission was originated by user U. Once the signature has been determined by the switch to be valid, service for call completion is allowed, as shown in step 340.

Figure 4:
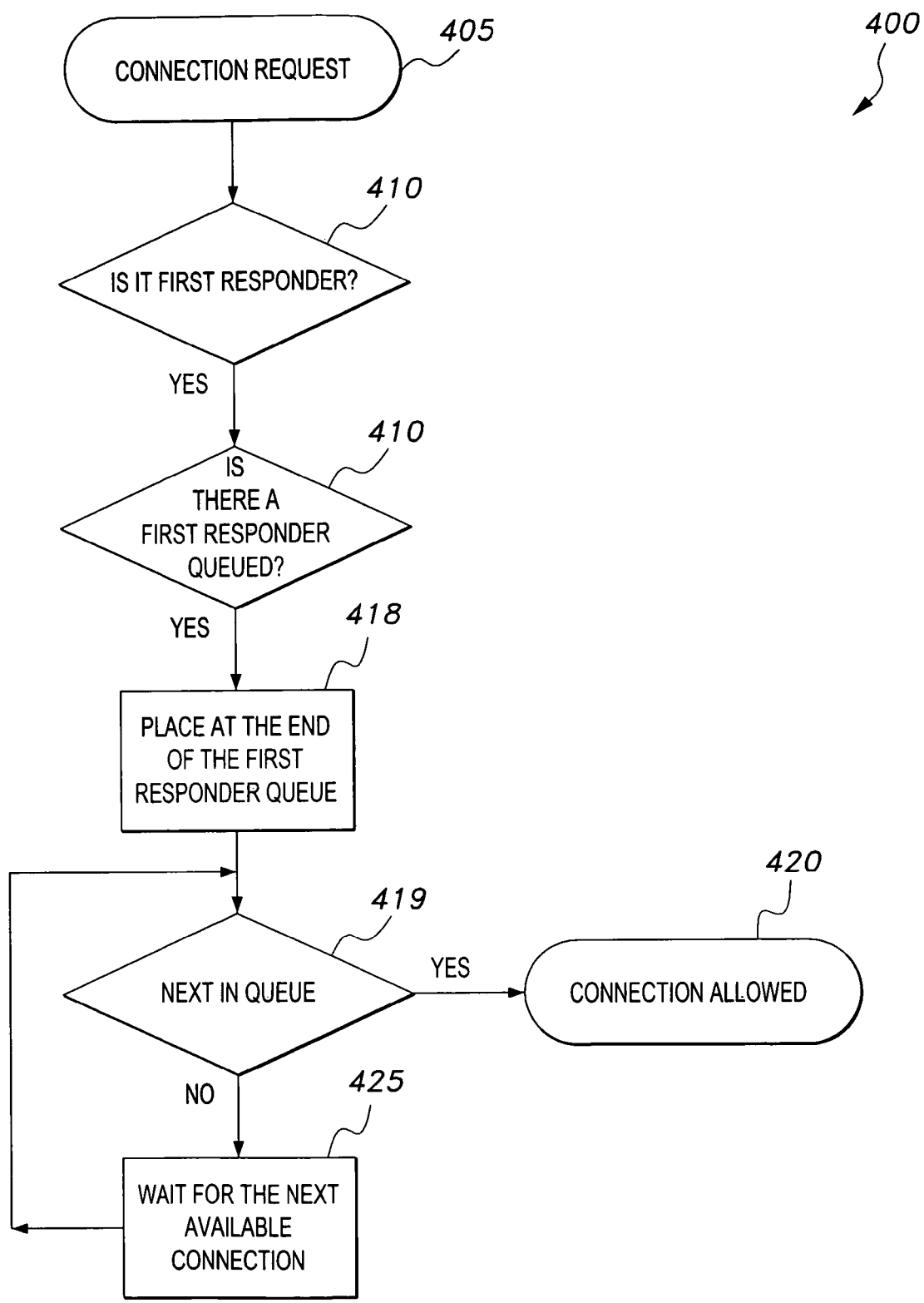
FIG. 4 is a flow diagram of cell service, according to the present invention.

As shown in FIGS. 1 and 4, cell service flow 400 at the switch 130 proceeds from a connection request at step 405. Subsequent to the connection request a query is made at step 410 to determine whether the requester is a first responder. It is within the scope of the present invention to provide a call completion protocol that includes placing a digitally signed 911 request using a PIV of a user who is not designated as a first responder at the end of a first responder queue. In any event, the call completion protocol directs queuing priority responsive to the digitally signed object.

Otherwise, as shown at step 420, if the queue is empty, the first responder request is immediately processed for call completion. If the queue is not empty, the first responder request is placed at the end of the queue, as shown in step 418 and waits for a next available connection, as shown in steps 419 and 425. Thus, a FIFO queue has been described for the processing of first responders in the switch 130.

Figure 5:
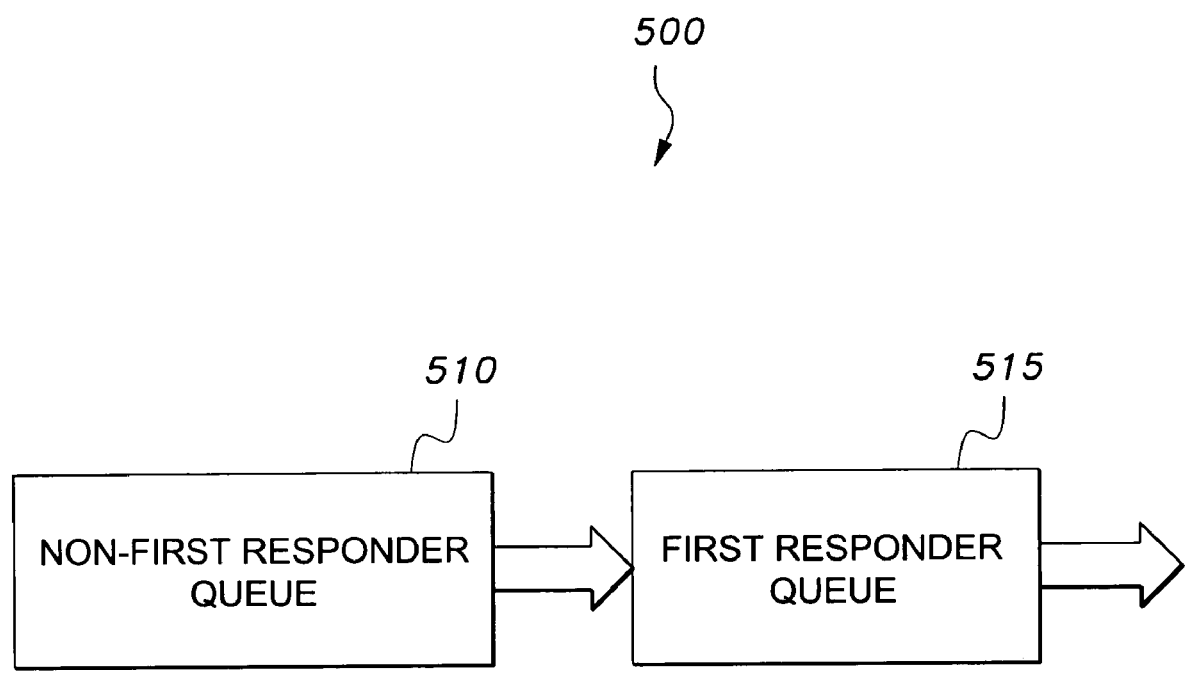
FIG. 5 is a diagrammatic illustration of call prioritization, according to the present invention.

FIG. 5 illustrates the priority allocation of calls processed by the switch 130 during the emergency event. Increasing priority is designated by the arrows flowing from left to right. Note that the top of first responder FIFO queue 515 has the highest priority for call completion. The entire first responder FIFO queue 515 has priority over the non first responder FIFO queue 510.

It should be noted that the first responder communication system according to the present invention may be implemented by a combination of the aforementioned described physical interfaces and software distributed within the system, including software in the cell phone 107, the card 105, and the switch 130.

It is to be understood that the present invention is not limited to the embodiment described above, but encompasses any and all embodiments within the scope of the following claims.

I claim:

1. A first responder communication system for cellular phone prioritization, comprising:
    at least one cellular telephone operable to communicate with a mobile cellular switching system;
    the cellular telephone having a connection to a Personal Identity Verification (PIV) integrated circuit card belonging to a first responder, the card including a digitally signed photograph of the first responder, public key infrastructure (PKI) certificates, first responder identity, logical elements required for cryptographic and digital signing of data objects, encrypting and decrypting data objects, PIN processing, and biometric data processing;
    the integrated circuit card connection providing an authentication interface so that a first responder can issue an authentication code to the integrated circuit card using the cellular telephone thereby enabling the PIV card and authenticating the first responder;
    storage in the cellular telephone for storing a digital signature issued by the integrated circuit card responsive to proper verification of the authentication code, wherein the storage further includes the cellular telephone having a data structure defining a validity time period that indicates how long the first responder has priority access to the cell phone system;
    a transmission to the switching system of an object comprising an identifying number of the cellular telephone and the digital signature;
    a call completion protocol in the switching system;
    the call completion protocol being responsive to the digitally signed object;
    wherein a call placed by the at least one cellular telephone is completed by the mobile cellular switching system thereby allowing the first responder to have priority access to the cell phone system in order to communicate with a called party of the call.

2. The first responder communication system according to claim 1, wherein the storage further comprises:
    the cellular telephone having a data structure comprising the cellular telephone identifying number;
    the data structure being accessible to the integrated circuit card for content encryption and subsequent digital signing; and,
    the data structure having the capability of storing the encrypted and digitally signed identifying number.

3. The first responder communication system according to claim 1, wherein the authentication interface further comprises an interface with the keypad of the cellular telephone.

4. The first responder communication system according to claim 1, wherein the priority access continues for the validity time period even though the integrated circuit card has been removed from the cell phone interface.

5. The first responder communication system according to claim 1, further comprising a first digital signature validity checker that prevents the cell phone from making the call if the digital signature is invalid based on first signature validity criteria.

6. The first responder communication system according to claim 1, wherein the mobile cellular switching system has a means for denying access to users who are not emergency first responders after an emergency is declared.

7. The first responder communication system according to claim 6, wherein the mobile cellular switching system has a busy signal generator that is activated during an emergency to send a busy signal to the cell phones of the users who are not emergency first responders.

8. The first responder communication system according to claim 1, wherein the call completion protocol has a FIFO queue provided for call completion of first responder initiated calls.

9. The first responder communication system according to claim 8, wherein the call completion protocol has a FIFO queue for users who are not first responders, from which call completion may be processed only when the first responder FIFO queue is empty.

10. The first responder communication system according to claim 1, further comprising a second digital signature validity checker that prevents the switch from completing the call if the digital signature is invalid based on second digital signature validity criteria.

11. The first responder communication system according to claim 1, wherein the transmission is encrypted, based on a private encryption key of the first responder.

12. The first responder communication system according to claim 1, wherein the object further comprises an emergency responder designation made available by the integrated circuit card.

13. The first responder communication system according to claim 1, wherein a public encryption key of the first responder is known to the mobile cellular switching system.

14. The first responder communication system according to claim 8, wherein a digitally signed 911 request using a PIV of a user who is not a first responder is queued at the end of the first responder FIFO queue.

* * * * *